United States Patent
Bonaccio et al.

(10) Patent No.: US 7,793,237 B2
(45) Date of Patent: Sep. 7, 2010

(54) SYSTEM, STRUCTURE AND METHOD OF PROVIDING DYNAMIC OPTIMIZATION OF INTEGRATED CIRCUITS USING A NON-CONTACT METHOD OF SELECTION, AND A DESIGN STRUCTURE

(75) Inventors: Anthony R. Bonaccio, Shelburne, VT (US); Joseph A. Iadanza, Hinesburg, VT (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 11/957,584

(22) Filed: Dec. 17, 2007

(65) Prior Publication Data

US 2009/0152543 A1 Jun. 18, 2009

(51) Int. Cl.
*G06F 17/50* (2006.01)
(52) U.S. Cl. .............. 716/2; 340/572.1; 340/572.8; 340/10.1; 340/10.41; 365/189.09; 257/48
(58) Field of Classification Search ............ 716/2; 340/572.1, 572.8, 10.1, 10.41; 365/189.09; 257/48

See application file for complete search history.

(56) References Cited

U.S. PATENT DOCUMENTS

| | | | |
|---|---|---|---|
| 5,945,920 A | 8/1999 | Maletsky | |
| 6,097,347 A * | 8/2000 | Duan et al. | 343/802 |
| 6,141,583 A * | 10/2000 | Pape et al. | 607/2 |
| 6,229,443 B1 | 5/2001 | Roesner | |
| 6,362,738 B1 | 3/2002 | Vega | |
| 6,554,188 B1 | 4/2003 | Johnson et al. | |
| 6,806,808 B1 * | 10/2004 | Watters et al. | 340/10.41 |
| 6,809,952 B2 | 10/2004 | Masui | |
| 6,812,841 B2 | 11/2004 | Heinrich et al. | |
| 6,841,981 B2 | 1/2005 | Smith et al. | |
| 6,850,080 B2 | 2/2005 | Hiroki | |
| 6,879,809 B1 | 4/2005 | Vega et al. | |
| 6,891,391 B2 | 5/2005 | Hiroki | |
| 6,914,528 B2 | 7/2005 | Pratt et al. | |
| 6,922,146 B2 | 7/2005 | Yogev et al. | |
| 6,972,662 B1 | 12/2005 | Ohkawa et al. | |
| 6,995,655 B2 | 2/2006 | Ertin et al. | |
| 7,009,495 B2 | 3/2006 | Hughes et al. | |
| 7,009,526 B2 | 3/2006 | Hughes et al. | |
| 7,019,618 B2 | 3/2006 | Pratt et al. | |
| 7,088,246 B2 | 8/2006 | Fukuoka | |
| 7,105,365 B2 | 9/2006 | Hiroki et al. | |
| 7,116,240 B2 | 10/2006 | Hyde | |
| 7,155,172 B2 | 12/2006 | Scott | |
| 7,180,404 B2 * | 2/2007 | Kunerth et al. | 340/10.41 |
| 7,183,924 B1 | 2/2007 | Ku | |
| 7,307,534 B2 * | 12/2007 | Pesavento | 340/572.1 |

(Continued)

*Primary Examiner*—Naum B Levin
(74) *Attorney, Agent, or Firm*—David Cain; Roberts Mlotkowski Safran & Cole, P.C.

(57) ABSTRACT

A system, structure and method is provided for providing dynamic optimization of integrated circuits using a non-contact method of selection, and a design structure on which a subject circuit resides. The method is provided for optimizing an electronic system having at least one integrated circuit. The method includes storing a target performance voltage of the at least one integrated circuit; remotely querying the at least one integrated circuit to obtain the target performance voltage; and providing an operational voltage of a next-level assembly according to the stored target performance voltage.

22 Claims, 7 Drawing Sheets

U.S. PATENT DOCUMENTS

| | | | |
|---|---|---|---|
| 7,477,552 B2 * | 1/2009 | Haid et al. | 365/189.09 |
| 2003/0189483 A1 * | 10/2003 | Saitoh et al. | 340/10.1 |
| 2006/0071793 A1 * | 4/2006 | Pesavento | 340/572.1 |
| 2006/0087785 A1 * | 4/2006 | Bender et al. | 361/93.1 |
| 2006/0158333 A1 * | 7/2006 | Garber et al. | 340/572.2 |
| 2007/0046369 A1 * | 3/2007 | Schober et al. | 330/7 |
| 2007/0087719 A1 * | 4/2007 | Mandal et al. | 455/299 |
| 2007/0188342 A1 * | 8/2007 | Valeriano et al. | 340/825.49 |
| 2008/0164907 A1 * | 7/2008 | Mercaldi-Kim et al. | 326/41 |
| 2008/0170458 A1 * | 7/2008 | Haid et al. | 365/227 |
| 2008/0186137 A1 * | 8/2008 | Butler et al. | 340/10.1 |

* cited by examiner

ID OF THE INVENTION

The invention relates to a system, structure and method of providing dynamic optimization of integrated circuits using a non-contact method of selection, and a design structure on which a subject circuit resides.

BACKGROUND DESCRIPTION

The manufacture of integrated circuits (IC) is becoming ever more complicated as finer and finer geometries are designed into today's semiconductor ICs. For example, as manufacturing processes become more complex due to the finer geometries, the physical and electrical variance between ICs fabricated on the same wafer become more difficult to control. The variance can even increase as different ICs are manufactured on a single wafer. These variances can contribute greatly to performance differences between otherwise identical IC chips, which, in turn, can affect downstream assemblies, e.g., (next level manufacturing). For these and other reasons, IC designs must account for processing differences such as, for example, variations in temperature and voltage within specified windows at system level to insure function of the final product.

As a result of such variations, the performance specification window for ICs is currently very wide. Such windows include ICs built with best case process bias (BCPB) and worst case process bias (WCPB). But, using ICs with BCPB and WCPB on a same card or system can degrade performance of the assembly. For example, transistor devices built with BCPB leak more DC current under static conditions contributing significantly to IC power consumption at a fixed voltage, while providing performance above that needed at system level. Transistor devices built with WCPB, on the other hand, consume very little power at the same fixed voltage, while being challenged to meet the performance requirements of the system. Thus, as a card or system manufacturer assembles a single system with ICs built from both BCPB and WCPB, some subset of ICs will operate at or near their functional limit while others are burning more power than is required to operate at the system frequency.

As such, while the IC designer must negotiate the IC fabrication processes, the card or system designer must successfully integrate a number of ICs into a functional next level assembly. However, the ICs which are to be integrated more than likely are manufactured by different IC manufacturers at different times with different processes. This being the case, the card or system designed must function with any mix of ICs provided by the IC suppliers, as a mix of ICs with BCPB, WCPB or nominal process bias (NPB) may exist in the assembly.

In a known method, IC suppliers may performance sort or screen ICs during IC final test to insure that ICs which do not meet a specified performance at a given temperature and voltage are not shipped to the assembler, or that ICs be grossly binned into fast and slow subsets to be used for different system performance levels. But these methods subtract from IC yield, add to inventory costs and prove difficult for next level manufacturing as the number of ICs in the card or system grows due to the functional complexity of such cards or systems. As to the latter issue, for example, IC manufacturers may not be able to provide enough "fast" or "low power" product to keep the next level of manufacturing on schedule. Additionally, such methods do not guarantee that power is minimized at the required performance level for the IC.

Also, to guarantee functionality, the card/system designer must achieve timing closure accounting for maximum performance skew between the various ICs in the assembly. This requirement generally results in a degradation of performance specifications relative to the ideal that would be possible if all ICs could be guaranteed to be at the same performance level during system/card level integration.

Accordingly, there exists a need in the art to overcome the deficiencies and limitations described hereinabove.

SUMMARY OF THE INVENTION

In a first aspect of the invention, a method of optimizing an electronic system having at least one integrated circuit, comprises: storing a target performance voltage of the at least one integrated circuit; remotely querying the at least one integrated circuit to obtain the target performance voltage; and providing an operational voltage of a next-level assembly according to the stored target performance voltage.

In embodiments, the target performance voltage is within an optimal supply voltage range for the at least one integrated circuit. The at least one integrated circuit is a batch of integrated circuits, various of which are of different technologies. The wherein the method further comprises: testing at least two integrated circuits of the batch of integrated circuits to determine the target performance voltage for each of the at least two integrated circuits; storing the target performance voltage for each of the at least two integrated circuits on each of the integrated circuits; querying each of the integrated circuits for the target performance voltage; and providing the target performance voltage in order to determine that the at least two integrated circuits are compatible for assembly. The remotely querying includes querying a radio frequency unit on the at least one integrated circuit by use of RFID technology. The e storing is provided in a non-volatile memory integrated with the integrated circuit. The storing includes storing a representation of the target performance voltage in a storage unit of the integrated circuit. The storing includes programming a non-volatile memory of the at least one integrated circuit with the target performance voltage.

The method further comprises optimizing an operational voltage or power consumption of the electronic system by using compatible integrated circuits based on compatible operational voltages obtained from the target performance voltage of each of the at least one integrated circuit. The method further comprises testing the at least one integrated circuit until the target performance voltage is achieved. The achieving includes incrementing or decrementing a voltage of the at least one integrated circuit to reach the target performance voltage. The method further comprises determining whether the voltage is at a minimum voltage or a maximum voltage. If the at least one integrated circuit is not at a minimum voltage, the method decrements the voltage of the at least one integrated circuit. If the at least one integrated circuit is not at a maximum voltage, the method increments the voltage of the at least one integrated circuit. The method of further comprises manufacturing the at least one integrated circuit with a functional unit, a performance monitoring unit, a storage unit and a radio frequency identification unit.

In another aspect of the invention, a method comprises setting and tracking in a non-contact manner minimum circuit operational voltage of integrated circuits to optimize a voltage/power operating point of an upper level assembly.

In a further aspect of the invention, a structure on an integrated circuit is provided. The structure includes a non-volatile performance parameter storage unit which is configured to store performance data of the integrated circuit; and a radio frequency unit configured to provide the performance data stored in the non-volatile performance parameter storage unit upon a non-contact query.

In yet another aspect of the invention, a design structure embodied in a machine readable medium for designing, manufacturing, or testing a design is provided. The design structure comprises: a non-volatile performance parameter storage unit which is configured to store performance data of the integrated circuit; and a radio frequency unit configured to provide the performance date stored in the non-volatile performance parameter storage unit upon a non-contact query.

BRIEF DESCRIPTION OF THE DRAWINGS

The present invention is described in the detailed description which follows, in reference to the noted plurality of drawings by way of non-limiting examples of exemplary embodiments of the present invention, in which.

DETAILED DESCRIPTION OF EMBODIMENTS OF THE INVENTION

Figure 1:
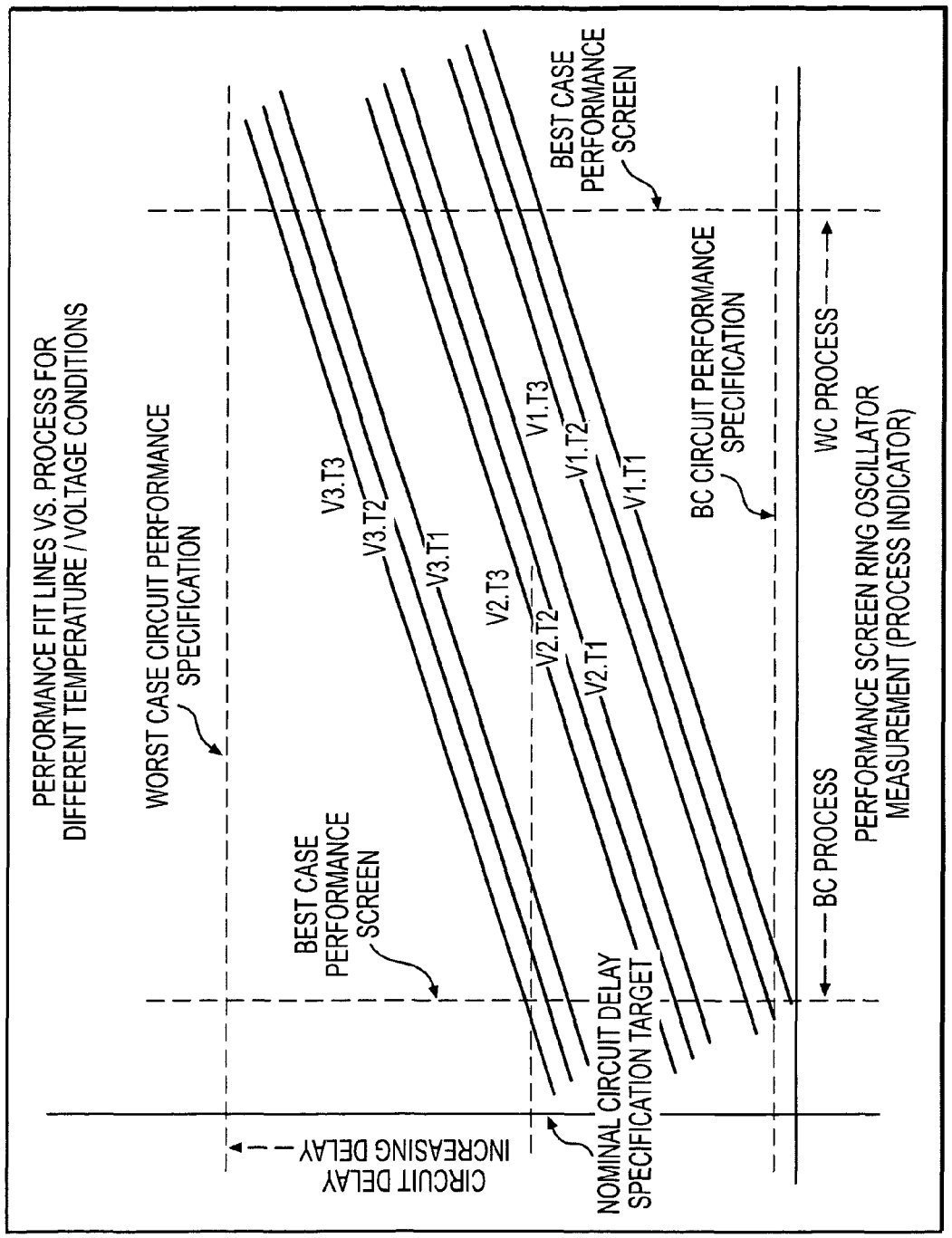
FIG. 1 illustrates a performance of a ring oscillator circuit built within an IC as a function of process bias, temperature and voltage.

The invention relates to a system, structure and method of providing dynamic optimization of integrated circuits using a non-contact method of selection, and a design structure on which a subject circuit resides. In implementation, Radio Frequency Identification (RFID) in combination with non-volatile storage and an interface for receiving performance characteristics is provided on each IC module (and/or upper level assembly). The non-volatile storage, e.g., memory, stores IC process characteristics obtained from a performance testing unit such as a ring oscillator. The characteristics can include information such as, for example, voltage, temperature and processing bias. More specifically, the characteristics may include nominal performance points, which may include a matrix of voltages at different temperatures, at any required or desired granularity. These characteristics can be relayed to the assembler or any downstream manufacturer via a non-contact method such as by way of RFID.

The invention advantageously provides secondary performance sorting at the IC manufacturer site, if required, without the need for any additional contacted IC test. Moreover, by implementing the system, structure and method of the invention, it is now possible to provide a homogenous shipment of ICs to a card/system manufacturer without the need for performance sort separation, which is a manually time consuming and expensive process. The invention thus allows for performance matching for many disparate ICs which comprise a card or system (generally referred hereinafter as a "system") based upon a common RFID method to minimize on-system performance differences. Moreover, it is now possible to tune on-system power supplies using high precision programmable regulation to set the voltage of the system in accordance with the RFID signatures of the IC components, either as a group (worst RFID sets supply) or individually. The invention can also be implemented at the system level by propagation of the IC RFID signatures to the card (e.g., higher system) level for subsequent sorting or voltage tuning during system build.

Thus, the invention provides a method to group ICs into higher level systems in a manner which allows for voltage tailoring and hence optimization of the system. Accordingly, by implementing the invention, the voltage levels on a system can be elevated to provide for a target performance without large increases in power dissipation when the ICs selected for the system are generally WCPB. Similarly, voltage levels on the system can be reduced to provide improved power dissipation without compromising system performance when the ICs selected for the system are generally BCPB. Therefore, the invention constrains both the performance and power of a system containing multiple disparate ICs to a tighter distribution around a norm than what would normally be possible with random IC selection. This can be done with ease of use, repeatability and scalability, and with applicability to higher levels of assembly. The invention can also be implemented at lower cost than previous sorting methodologies. Moreover, because all ICs in the system would have similar characteristics, global control of VDD could be used to effect the drive to nominal.

FIG. 1 illustrates a performance of a ring oscillator circuit built within an IC as a function of process bias, temperature and voltage. The specification window, shown as a box within FIG. 1, is bounded by the best case and worst case performance screens, as well as the best case and worst case performance specifications. The performance window takes into account all possible combinations of process bias allowed to be shipped by the IC manufacturer, as well as all possible permutations of temperature and voltage allowed within the IC specification. While IC performance is influenced by shifts in voltage or temperature, process variance can be seen to contribute significantly to the performance of the IC which may vary by 1.5× at a fixed voltage/temperature condition.

Figure 2:
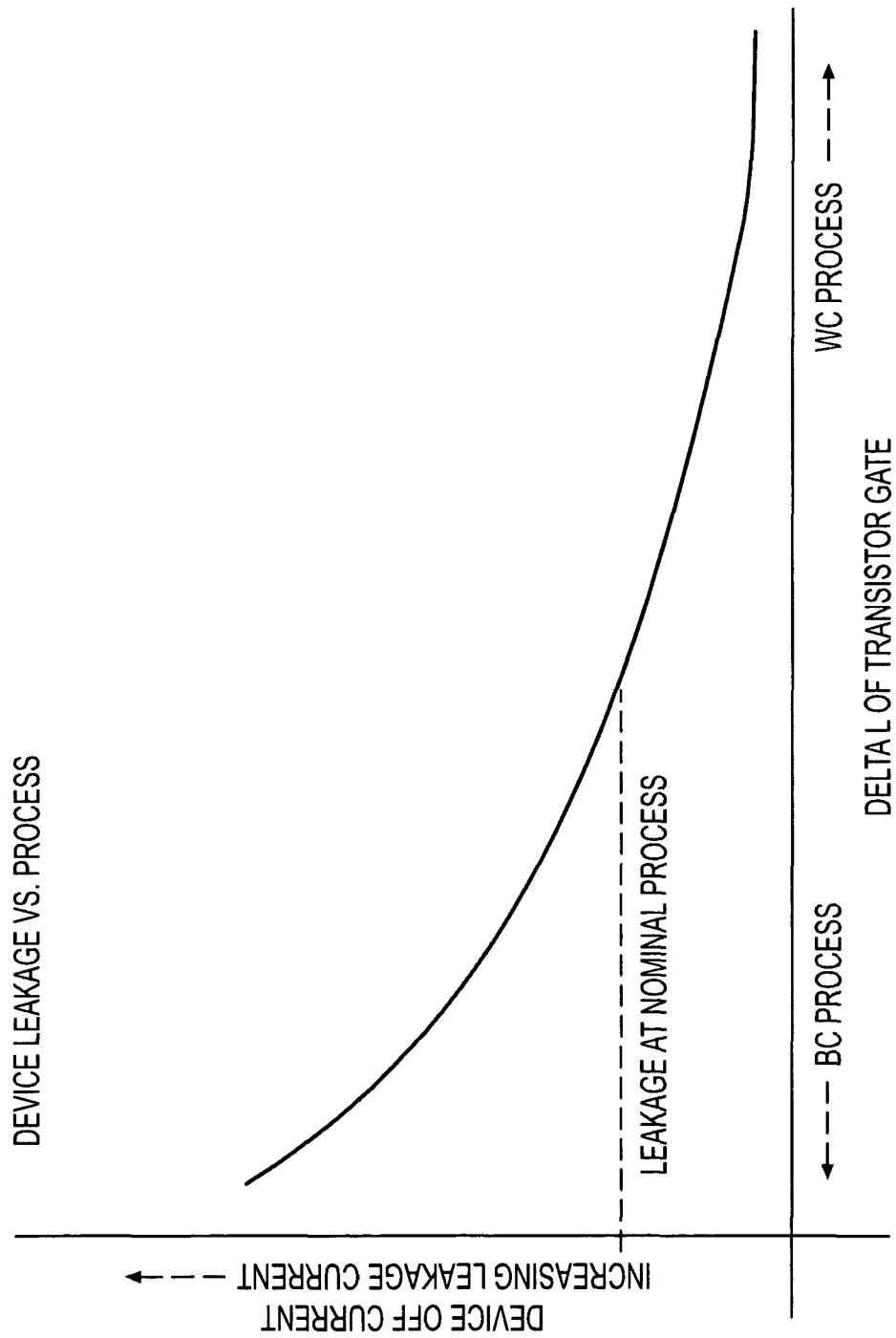
FIG. 2 is a performance graph of an exemplary IC.

FIG. 2 is a performance graph of an exemplary IC. The graph shows leakage vs. device performance. As seen from FIG. 2. while best case process bias clearly yields the highest IC performance, it also yields the highest power consumption.

Figure 3:
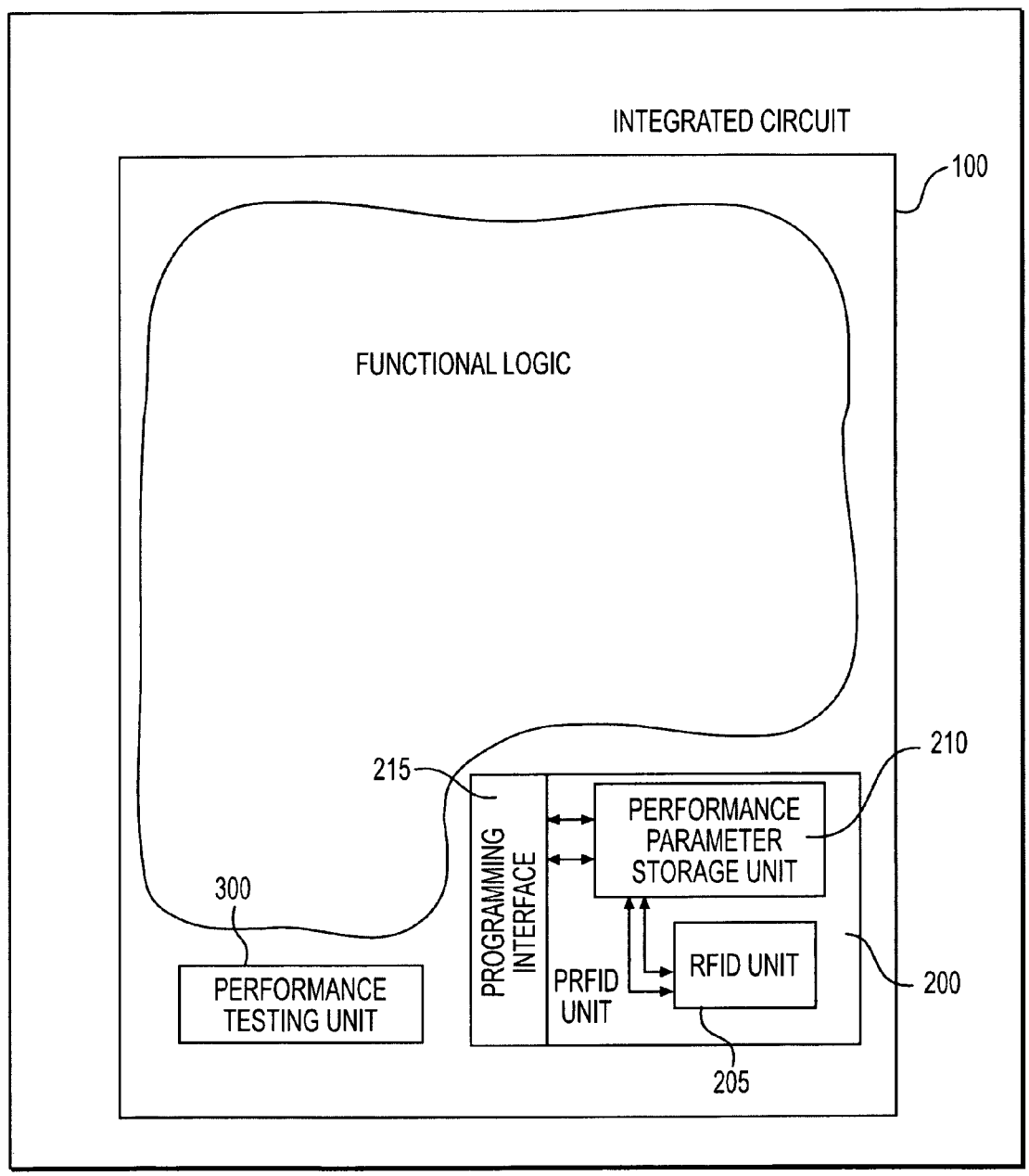
FIG. 3 shows a system and structure in accordance with an aspect of the invention.

FIG. 3 shows a system and structure in accordance with an aspect of the invention. More specifically, FIG. 3 shows an integrated circuit 100 with a Performance Radio Frequency Identification 200 (PRFID circuit) in accordance with the invention. In embodiments, the PRFID circuit 200 is implemented within each IC 100 designed/targeted for use within a sub-system (e.g., card, module, etc.) or higher level system build. The PRFID circuit 200 contains an RFID transmitter/receiver 205. The RFID transmitter/receiver 205 can be any appropriate RFID transmitter/receiver known to those of skill in the art and, as such, further explanation of the RFID transmitter/receiver 205 is not necessary for an understanding of the invention.

The PRFID circuit 200 also includes a performance parameter storage (PPS) unit 210. The PPS unit 210 contains programmable, nonvolatile memory elements that may be implemented as FLASH, fuse, anti-fuse, E-fuse or by other mechanisms which do not require power up. As discussed herein, the PPS unit 210 is structured, designed and configured to store process characteristics of the IC, obtained from a performance testing unit 300, via a programming interface 215. In this configuration, the programming interface 215 may program the PPS unit 210 with performance data after IC final test, e.g., operational frequency against a norm. The programming interface 215 may be wired to the PPS unit 210, which permits information to be sent and programmed to the PPS unit 210 and then accessed through the RFID unit 205.

The performance testing unit 300 may be, for example, a ring oscillator which is used to test a completed IC. However, those of skill in the art should understand that the present invention should not be limited to a ring oscillator. By way of other embodiments, a functional at speed AVP-based testing, functional at-speed BIST testing, delay path measurement, system emulation/in-system test and/or electrical parametric testing could also be used as a performance measurement technique in accordance with the invention.

In the case of a ring oscillator, for example, as part of the testing sequence, the ring oscillator can be used for performance testing the IC to benchmark the performance of the IC at a first voltage and a known constant temperature. This measurement can then be compared against a predetermined target value for the IC. If the measured performance exceeds the target, the voltage can be reduced and the IC retested, with voltage stepping and testing continuing until the performance measurement (also referred to as performance data) is substantially at the target value. If, on the other hand, the measured performance is below the target value, the voltage can be increased and the IC retested. Again, voltage stepping and testing can continue until the performance measurement is substantially at the target value. The performance data can be stored in the PPS unit 210. Testing using the other methods described herein can also be used to provide the required performance data for storage and future use, as described herein.

In further embodiments, the performance data loaded to the PPS unit 210 need not be a single value. For example, the IC may be tested at multiple temperatures and voltage requirements to meet the performance target for each temperature. The performance data may be stored in the PPS unit 210 as a matrix of voltage and temperature ranges. The knowledge of the required voltage vs. temperature may be used to provide additional flexibility in setting the power supply, to the extent that the supply voltage would move in situ as temperature increased.

In any scenario case, minimum/maximum voltage limits may be implemented to insure that technology or system level voltage constraints are not violated. Should any IC fail to attain target performance before a limit is reached, the IC may be judged defective and scrapped or dispositioned with a special voltage code indicating that it was either under-performance at the maximum voltage or over-performance at the minimum voltage and binned accordingly.

While in some cases the performance testing unit 300 is a single instance of a ring oscillator, or single at-speed functional test, in other cases, multiple tests are performed to determine the "performance sort" of the product. When multiple performance sort criteria are used, the required voltage to meet the target may be found for each performance monitor on the IC. In a first embodiment, the final voltage selected may be a voltage that centers all results statistically around the normalized performance value. In an alternative embodiment, the final voltage selected would guarantee that all performance monitors meet or exceed their target value. While the above description focuses on an IC with a single voltage supply, one skilled in the art would realize that the method described is applicable to ICs containing more than voltage supply domain in which case PRFID and test capability may exist for each domain.

With testing complete, the voltage at which the IC attains target performance is programmed into the PPS unit 210 of the PRFID circuit 200 along with an IC-type identifier. Additional performance data may also be programmed into the PPS unit 210 such as, for example, different process variations at different temperatures and voltages. The performance data can be provided as a matrix of process parameters.

In one embodiment, the performance data can be represented as a code. Conversion of the required voltage and/or IC-type identifier to programmed code may be governed by an industry standard for each power supply range such that various IC manufacturers' codes have equivalent meaning. The code may also contain discrete information indicating that the IC passed or failed the test at some voltage level. The IC-type portion of the code may specify the IC manufacturer using a set of standard codes as well as the IC part number.

Following IC test and programming of the PPS unit 210, the ICs can undergo a contact-less (non-contact) verification screen before leaving the IC manufacturer. This screen can verify that all parts in a given lot to be shipped actually passed the final test at some voltage level and are of the correct intended sort level if such sorting is to be done at the IC manufacturer. This procedure would reduce the "tester walkaround" component of SPQL (shipped product quality level), which occurs when known bad parts are sorted into a bin with "good" parts. In embodiments, this test would be done simultaneously on large quantities of parts using known RFID techniques, searching only for signatures indicating that an undesirable part or parts have been mixed in with the good parts.

Once IC test (and subsequent verification, if used) is complete and the PRFID circuit 200 is programmed, the IC may be shipped to the next level of assembly, where it is mounted to a system at the system level. The mounting may take days, weeks, months or years later.

Next level assembly combines many different IC part numbers from different manufacturers into a single functional unit. During assembly, lots of each IC to be mounted onto the system are loaded by separate dispensing mechanisms from which ICs are selected in a first-in-first-out manner. As each incoming IC to be integrated onto a single system is ready for mounting, the PRFID circuit 200 is scanned to determine the PPS data from each IC. The data can be compared to insure that all ICs selected for the particular system mount are voltage-compatible. Although it is desirable that all ICs on the card have the same PPS-designated voltage, the system assembler may allow for some variance in performance voltage around a predetermined range. Should all ICs be bound for a single system have a compatible voltage or voltage range, the assembly process continues. Moreover, with the known information about the ICs, it is now possible to tune on-system power supplies using high precision programmable regulation to set the voltage of the system in accordance with the RFID signatures of the IC components.

ICs are then mounted to the system and a composite voltage code constructed from the voltage codes from each IC on the card is constructed in a manner which guarantees all ICs on the card will meet performance requirements. Should a PPS-compatible set not be found with the IC selection, one or more of the ICs initially selected for assembly may be "binned" and replacement ICs selected and PRFID scanned. The process may continue until an acceptable set of ICs is found.

While taught above as occurring just prior to assembly, the PRFID pairing described herein may also be practiced as a separate step prior to system assembly where each IC is separately binned into the voltage groups desired by the manufacturer after IC manufacture, without the IC manufacturer knowing the manufacturer sort requirements. In this scenario, the system manufacturer would bin each IC type according to the voltage granularity desired with the non-contact test described herein, and then load compatible sorts of the different ICs to go onto a system to system assembly. In an alternative embodiment, sets of ICs may be matched for performance prior to system assembly in a manner similar to the above without binning, and then ordered into the assembly process to guarantee FIFO operation.

Exemplary Processes in Accordance with the Invention

Figure 4:
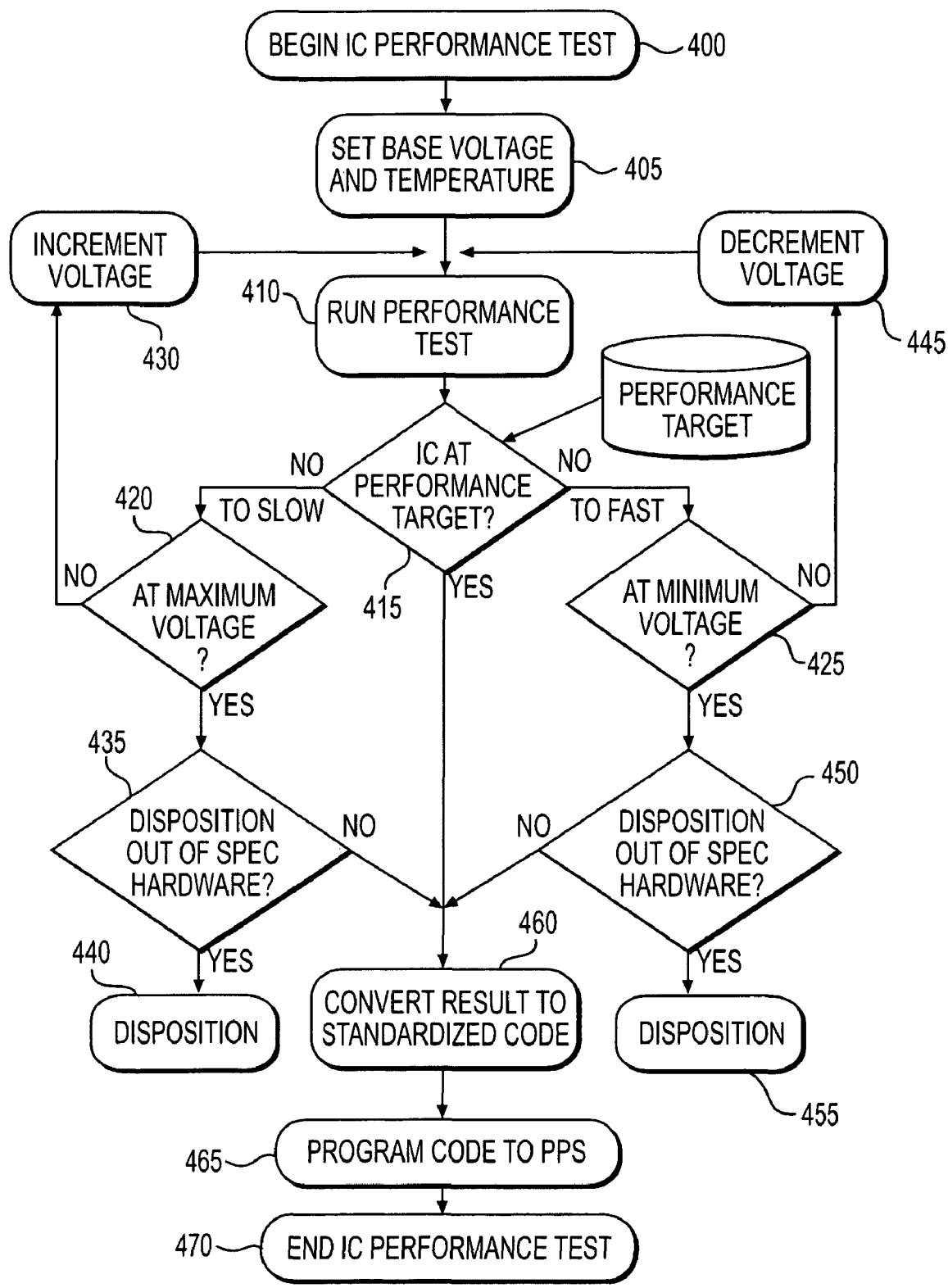
FIG. 4 shows a flow chart implementing processes according to the invention.
Figure 5:
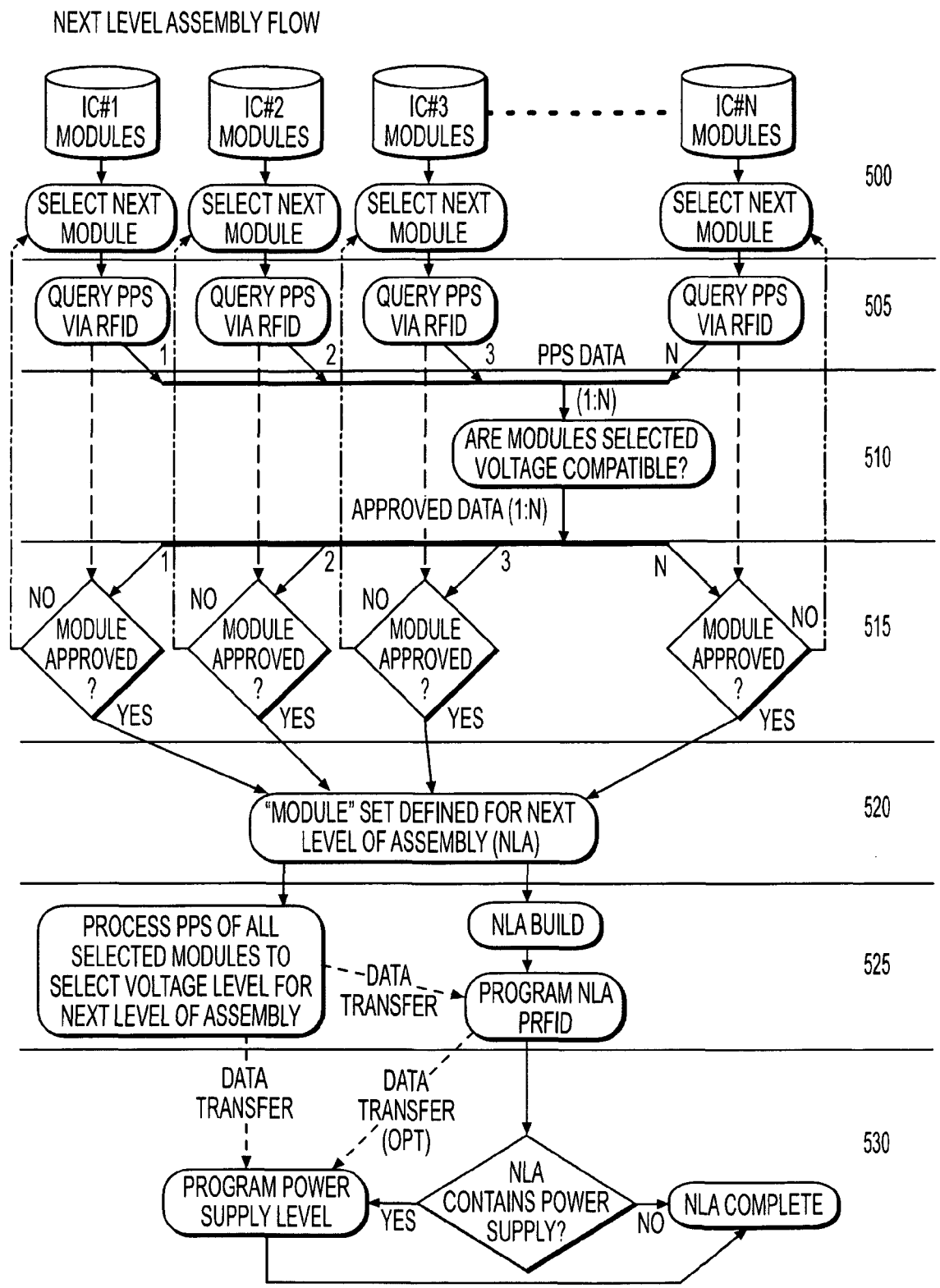
FIG. 5 is a swim lane diagram implementing processes according to aspects of the invention.

FIGS. 4 and 5 are flow diagrams showing processing steps of embodiments of the invention. FIGS. 4 and 5 may equally represent a high-level block diagram of components of the invention implementing the steps thereof. The steps of FIGS. 4 and 5 may be implemented on computer program code in combination with the appropriate hardware. This computer program code may be stored on storage media. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Additionally, the computer program code can be transferred to a workstation over the Internet or some other type of network.

The invention can take the form of an entirely hardware embodiment or an embodiment containing both hardware and software elements (any of which is referred generally as "file management program"). The hardware and software elements include a computer infrastructure configured to implement the functionality of the present invention as can be implemented by those of skill in the art, such as, for example, a known server manufactured by International Business Machines, Corp. or a personal computer. The software elements may be firmware, resident software, microcode, etc. In embodiments, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement.

Referring to FIG. 4, at step 400, the IC performance test begins in accordance with the invention. At step 405, the base voltage and temperature are set. At step 410, the test performance is run. At step 415, a determination is made as to whether the IC is running at a performance target. If the IC is not at a performance target, a determination is made as to whether the IC is at a maximum or minimum voltage at steps 420 and 425, respectively.

Referring to step 420, if the IC is not at a maximum voltage, the voltage is incremented at step 430 and the process returns to step 410. If the IC is at a maximum voltage, though, a determination is made at step 435 as to whether there should be a disposition of the out of specification hardware (IC). If there is to be a disposition, the disposition occurs at step 440. If there is not a disposition, then the process continues at step 460.

Referring to step 425, if, on the other hand, the IC is not at a minimum voltage, the voltage of the IC is decremented at step 445 and the process returns to step 410. If the IC is at a minimum voltage, though, a determination is made at step 450 as to whether there should be a disposition of the out of specification hardware (IC). If there is to be a disposition, the disposition occurs at step 455. If there is not a disposition, then the process continues at step 460.

If there is no disposition of the IC (whether because the IC is at a target performance or the IC is to be saved for other reasons), the process continues at step 460. In embodiments, the results of the test (and IC identification and/or other pertinent information) may be converted to a standardized code, which may include, amongst other parameters, voltage, temperature and other operational information. In embodiments, at step 465, the code (or parameters without code) is programmed into the PPS unit. At step 470, the process ends.

FIG. 5 shows a swim lane diagram of a next level assembly flow. The flow of FIG. 5 may represent a first level assembly of card, for example, are a higher level assembly. At level 500, a set of modules (ICs) are selected for assembly from a plurality of different module bins. At level 505, a non-contact query is made of the PPS via an RFID for each of the modules. At level 510, a determination is made as to whether the modules selected are voltage compatible. At level 515, a determination is made for each of the modules, individually, as to whether the module is approved for assembly. If not, for that module, the process returns to level 500. Once each of the modules are approved (e.g., the selected modules are compatible), the process continues to level 520. At level 520, the selected modules are tagged as a module set for next level of assembly. At level 525, the information stored in the PPS, for example, is also queried so that all of the selected modules can be set to a compatible voltage level for the next level of assembly. The query process occurs during the next level assembly build. The PRFID for the next level assembly can be programmed with the selected voltage for the next level of assembly.

At level 530, a determination is made as to whether the next level assembly contains a power supply. If there is no power supply, the next level assembly is complete. If there is a power supply, the power supply level is programmed into the next level. In embodiments, if there is no power supply on the system of modules, then the next level of assembly can be programmed with a power supply level, which may be provided to the system of modules through, for example, a backplane.

As should be understood by those of skill in the art in view of the above description, should the flow of FIG. 5 represent a final system build, the voltage calculated for the assembly is programmed into the system level PRFID and is used to provide fine programming to a programmable voltage supply for the system. In this manner, the power supply is designed with tighter tolerances and programming, and coupled with the PRFID, allows for setting of the voltage for the system at the minimum value required to operate at a desired performance, saving system power. However, should the processes be used in a sub-system level (e.g., card build), the card-level (e.g., lower level system) PRFID value is programmed and subsequently used to track the required voltage for system performance to the next level assembly.

Also, by including the manufacturer and part-number data in the PPS load allows the system to differentiate between multiple responses to a voltage query at system level. Differentiation may be accomplished either through filtering of the returned queries for the correct identifier sequence, or a broadcast of the identifier sequence during the query with decode and matching performed by each PRFID unit prior to response.

It should also be noted that the processes herein do not preclude card or system assembly when desired sets of ICs with similar voltage requirements cannot be found. In such a scenario, a system may be constructed with wider variance in a required supply voltage, with the PRFID system providing the minimum voltage information at which performance can be guaranteed for the system. For this reason, there are situations in which the IC will not be disposed even when outside of specifications.

Figure 6:
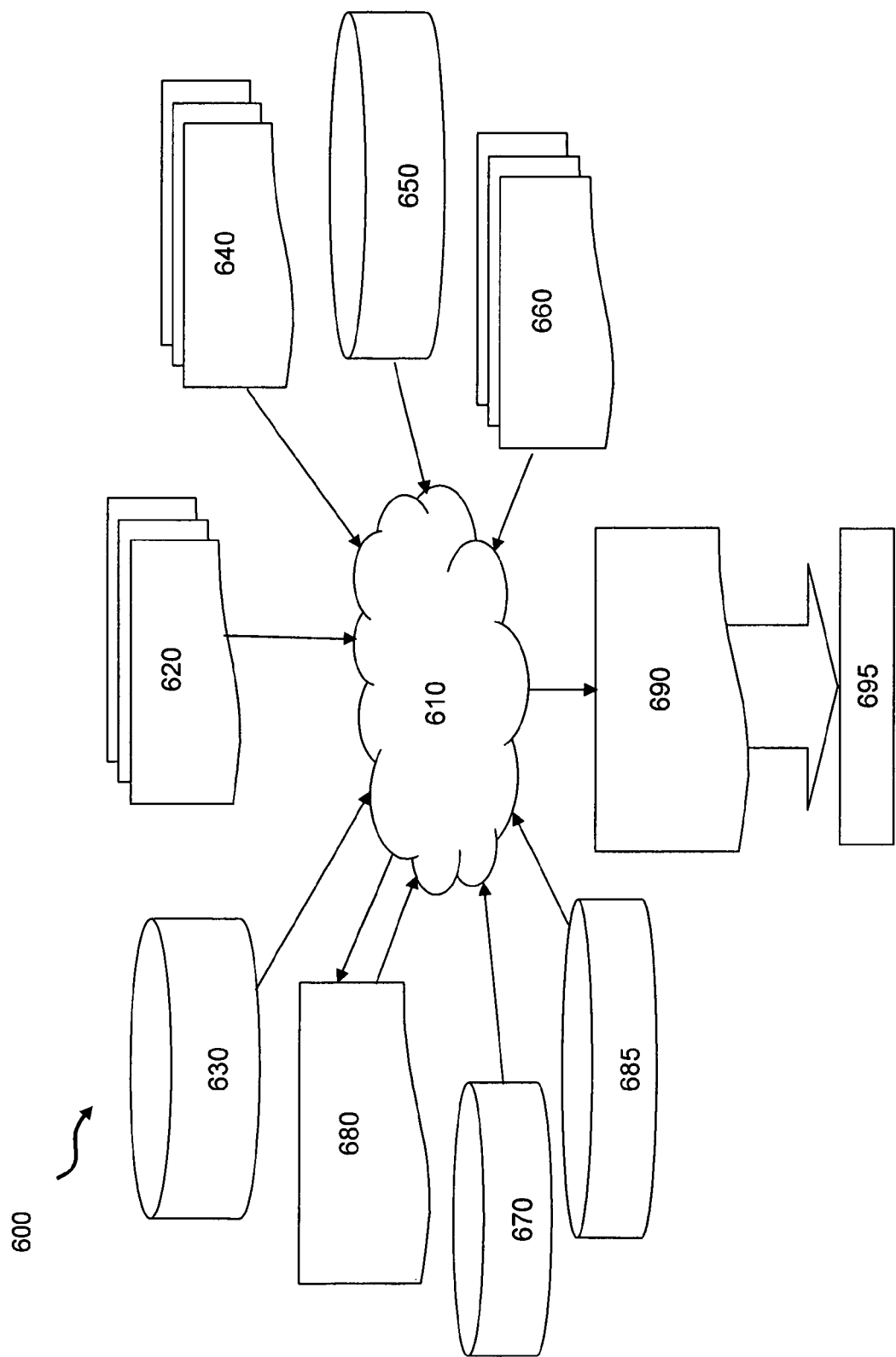
FIG. 6 is a flow diagram of a design process used in semiconductor design, manufacturing, and/or test.

FIG. 6 is a flow diagram of a design process used in semiconductor design, manufacturing, and/or test. FIG. 6 can also represent a block diagram of an example design flow 600. Design flow 600 may vary depending on the type of IC being designed. For example, design flow 600 for building an application specific IC (ASIC) may differ from a design flow 600 for designing a standard component. Design structure 620 is preferably an input to a design process 610 and may come from an IP provider, a core developer, or other design company or may be generated by the operator of the design flow, or from other sources. Design structure 620 comprises an embodiment of the invention shown in circuit 200 in the form of schematics or HDL, a hardware-description language (e.g., Verilog, VHDL, C, etc.). Design structure 620 may be contained on one or more machine-readable medium. For example, design structure 620 may be a text file or a graphical representation of an embodiment of the invention illustrated by circuit 200. Design process 610 preferably synthesizes (or translates) an embodiment of the invention illustrated by circuit 200 into a netlist 680, where netlist 680 is, for example, a list of wires, transistors, logic gates, control circuits, I/O, models, etc. that describes the connections to other elements and circuits in an integrated circuit design and recorded on at least machine-readable medium. For example, the medium may be a CD, a compact flash, other flash memory, a packet of data to be sent via the Internet, or other networking suitable means. The synthesis may be an iterative process in which netlist 680 is resynthesized one or more times depending on design specifications and parameters for the circuit.

Design process 610 may include using a variety of inputs. For example, the inputs can be from:
  (i) library elements 630 which may house a set of commonly used elements, circuits, and devices, including models, layouts, and symbolic representations, for a given manufacturing technology (e.g., different technology nodes, 32 nm, 45 nm, 90 nm, etc.);
  (ii) design specifications 640;
  (iii) characterization data 650;
  (iv) verification data 660;
  (v) design rules 670, and
  (vi) test data files 685 (which may include test patterns and other testing information).

Design process 610 may further include, for example, standard circuit design processes such as timing analysis, verification, design rule checking, place and route operations, etc. One of ordinary skill in the art of integrated circuit design can appreciate the extent of possible electronic design automation tools and applications used in design process 610 without deviating from the scope and spirit of the invention. The design structure of the invention is not limited to any specific design flow.

Design process 610 preferably translates) an embodiment of the invention illustrated by circuit 200, along with the rest of the integrated circuit design (if applicable), into a second design structure 690. Design structure 690 resides on a storage medium in a data format used for the exchange of layout data of integrated circuits and/or symbolic data format (e.g. information stored in a GDSII (GDS2), GL1, OASIS, map files, or any other suitable format for storing such design structures). Design structure 690 may comprise information such as, for example, symbolic data, map files, test data files, design content files, manufacturing data, layout parameters, wires, levels of metal, vias, shapes, test data, data for routing through the manufacturing line, and any other data required by a semiconductor manufacturer to produce an embodiment of the invention illustrated by circuit 200. Design structure 690 may then proceed to a stage 695 where, for example, design structure 690: proceeds to ape-out, is released to manufacturing, is released to a mask house is sent to another design house, is sent back to the customer, etc.

System Assembly (Card)

Figure 7:
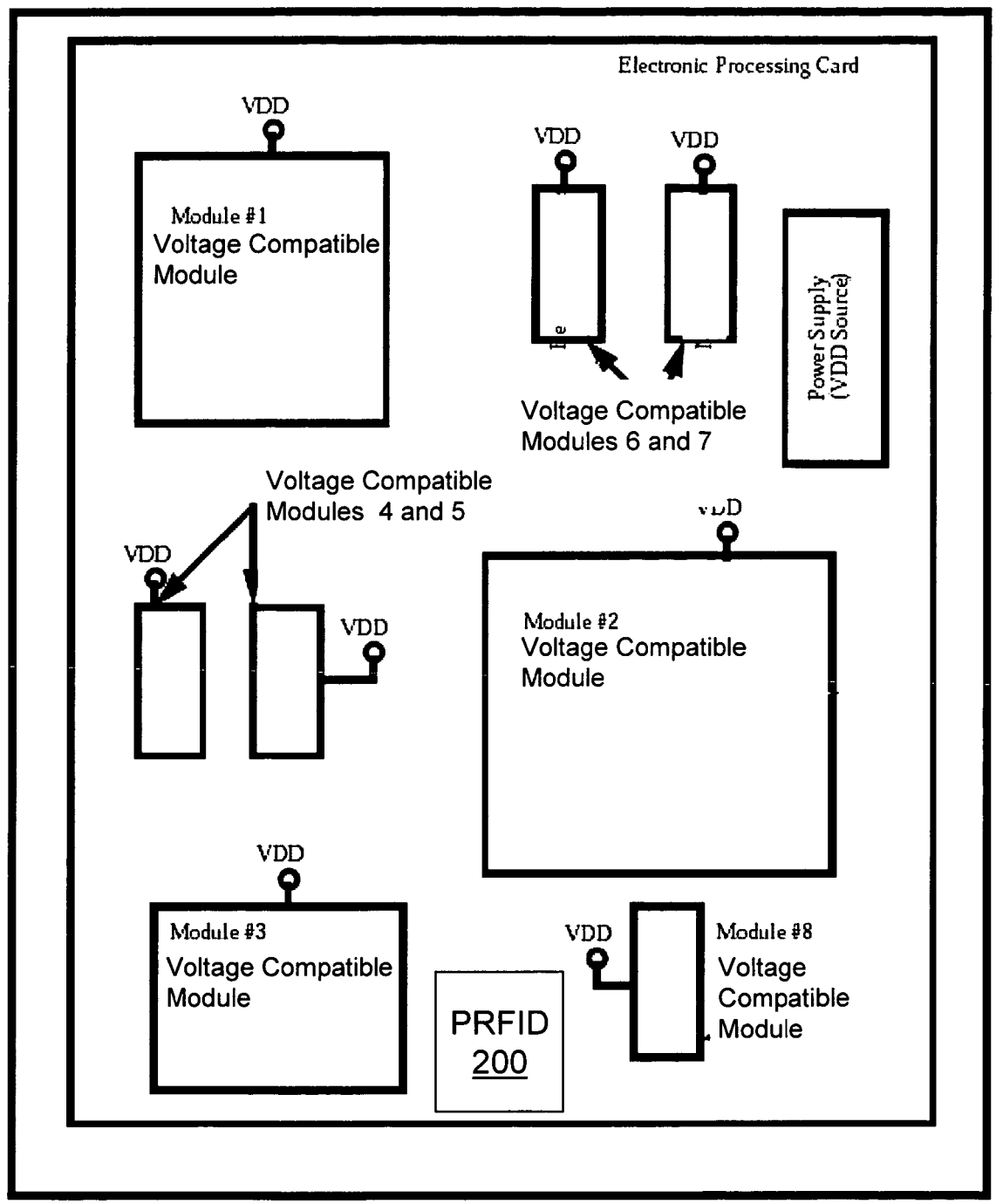
FIG. 7 is an assembled system implementing aspects of the invention.

FIG. 7 shows a system build implementing the system, method and design structure of the present invention. As shown in FIG. 7, modules 1-8 are provided on a card with a power supply. Prior to assembly, the modules 1-8 have been determined to be compatible in accordance with the processes and using the circuit of the invention. In embodiments, the modules may be of different technologies, provided by different manufactures and at different times. However, by implementing the system, method and design structure of the present invention it is possible insure that all of the modules, prior to assembly, are compatible. Also, as the voltage parameters are known, it is also possible to adjust the power supply to the optimal voltage in order for each of the modules 1-8 to run at optimal performance.

As further contemplated by the invention, the system (card) can be integrated into further systems using the system, method and design structure of the present invention. For example, at the assembly level, once the system (card) is assembled, the voltage (process information) at various temperatures or a single reading can be recorded in a non-volatile memory for retrieval at a next level assembly. At the next level assembly, two or more systems may be queried via a non-contact scan to determine their compatibility prior to build in accordance with the invention.

In embodiments, the power supply of the system can become the master for RFID application querying each IC in the system during functional operation for voltage data. For example, each IC may have its PPS/RFID function linked with an on-board temperature sensor in order to select the correct voltage for operation and broadcast requirements to the master upon request. Added functionality in the master would be responsible for processing requirements from all ICs in the system and selecting a voltage solution.

While the invention has been described in terms of exemplary embodiments, those skilled in the art will recognize that the invention can be practiced with modifications and in the spirit and scope of the appended claims.

It is claimed:
1. A method of optimizing an electronic system having at least one integrated circuit, the method comprising:
  storing a target performance voltage of the at least one integrated circuit in an identification circuit;

remotely querying the identification circuit associated with the at least one integrated circuit to obtain the target performance voltage of the at least one integrated circuit; and providing an operational voltage of a next-level assembly according to the stored target performance voltage of the at least one integrated circuit.

2. The method of claim 1, wherein the target performance voltage is within an optimal supply voltage range for the at least one integrated circuit.

3. The method of claim 1, wherein the at least one integrated circuit is a batch of integrated circuits, various of which are of different technologies, wherein the method further comprises:

testing at least two integrated circuits of the batch of integrated circuits to determine the target performance voltage for each of the at least two integrated circuits;

storing the target performance voltage for each of the at least two integrated circuits on each of the integrated circuits;

querying each of the integrated circuits for the target performance voltage; and providing the target performance voltage in order to determine that the at least two integrated circuits are compatible for assembly.

4. The method of claim 1, wherein the remotely querying the at least one integrated circuit for the target performance voltage includes querying a radio frequency unit on the at least one integrated circuit by use of RFID technology.

5. The method of claim 1, wherein the storing is provided in a non-volatile memory integrated with the integrated circuit.

6. The method of claim 1, further comprising optimizing an operational voltage or power consumption of the electronic system by using compatible integrated circuits based on compatible operational voltages obtained from the target performance voltage of each of the at least one integrated circuit.

7. The method of claim 1, wherein the storing includes storing a representation of the target performance voltage in a storage unit of the integrated circuit.

8. The method of claim 1, wherein the storing includes programming a non-volatile memory of the at least one integrated circuit with the target performance voltage.

9. The method of claim 1, further comprising testing the at least one integrated circuit until the target performance voltage is achieved.

10. The method of claim 9, wherein the achieving includes incrementing or decrementing a voltage of the at least one integrated circuit to reach the target performance voltage.

11. The method of claim 10, further comprising determining whether the voltage is at a minimum voltage or a maximum voltage, wherein if the at least one integrated circuit is not at a minimum voltage, decrementing the voltage of the at least one integrated circuit; and if the at least one integrated circuit is not at a maximum voltage, incrementing the voltage of the at least one integrated circuit.

12. The method of claim 1, further comprising manufacturing the at least one integrated circuit with a functional unit, a performance monitoring unit, a storage unit and a radio frequency identification unit.

13. The method of claim 1, wherein non-volatile storage stores integrated circuit process characteristics obtained from a performance testing unit for the at least one integrated circuit.

14. The method of claim 13, wherein the characteristics for the at least one integrated circuit include voltage, temperature and processing bias.

15. The method of claim 14, wherein the characteristics for the at least one integrated circuit include nominal performance points including a matrix of voltages at different temperatures, at any required or desired granularity.

16. The method of claim 14, wherein the characteristics are relayed to an assembler or downstream manufacturer via RFID.

17. The method of claim 13, Wherein the performance testing unit is a ring oscillator.

18. The method of claim 1, further comprising providing performance sorting at an IC manufacturer site without any additional contacted IC test.

19. The method of claim 1, further comprising providing a homogenous shipment of ICs to a card/system manufacturer without the need for performance sort separation.

20. The method of claim 1, further comprising providing performance matching for many disparate integrated circuits of the at least one integrated circuit which comprise a card or system based upon a common RFID method to minimize on-system performance differences.

21. The method of claim 1, further comprising tuning on-system power supplies using high precision programmable regulation to set voltage in accordance with RFID signatures of the at least one integrated circuit, either as a group or individually.

22. The method of claim 1, further comprising grouping several of the at least one integrated circuit into higher level systems which allows for voltage tailoring and optimization of the system.

* * * * *